Patented Apr. 20, 1948

2,440,229

UNITED STATES PATENT OFFICE 2,440,229

PROCESS OF MAKING ALPHA-ACETO, ALPHA-CHLORO, GAMMA-BUTYRO-LACTONE

Robert Zumbrunn, Basel, Switzerland, assignor to Hoffmann-La Roche Inc., Nutley, N. J., a corporation of New Jersey No Drawing. Application August 31, 1946, Serial No. 694,415. In Switzerland November 1, 1945

3 Claims. (Cl. 260—344)

This invention relates to the manufacture of α-chloro-α-aceto-γ-butyrolactone.

Several processes for halogenating α-aceto-γ-butyrolactone have been proposed. Thus, according to German specification No. 664,789, α-chloro-α-aceto-γ-butyrolactone is obtained in a yield of 87.7 per cent. from α-aceto-γ-butyrolactone by treatment with sulphuryl chloride in an ethereal solution. If, instead of sulphuryl chloride, chlorine gas is employed as the chlorinating agent, the yields obtained also amount to about 87 per cent. It appears, however, that disturbances set in as a result of the action exerted by the acid which is formed by the chlorination, thus impairing the yield of α-chloro-α-aceto-γ-butyrolactone.

It has now been found, according to the present invention that α-chloro-α-aceto-γ-butyrolactone can be obtained in high purity and in almost quantitative yield if the chlorination with chlorine gas takes place in the presence of water and of an acid-binding agent, preferably a carbonate of an alkaline earth metal.

Accordingly the present invention provides a process for the manufacture of α-chloro-α-aceto-γ-butyrolactone wherein α-aceto-γ-butyrolactone is chlorinated with chlorine gas in the presence of water and of an acid-binding agent, preferably a carbonate of an alkaline earth metal.

The following examples illustrate how the process of the invention may be carried into effect:

Example 1

500 parts by weight of α-aceto-γ-butyrolactone were stirred with 500 parts by weight of water and 210 parts by weight of calcium carbonate and, while cooling with ice, 277 parts by weight of chlorine gas allowed to pass into the mixture. When the chlorination had come to an end, excess calcium carbonate was dissolved with concentrated hydrochloric acid and the α-chloro-α-aceto-γ-butyrolactone separated in a separating funnel from the supernatant calcium chloride solution. Small quantities of α-chloro-α-aceto-γ-butyrolactone can still be extracted from the calcium chloride solution by means of a solvent insoluble in water, for example chloroform or benzene. The yield of α-chloro-α-aceto-γ-butyrolactone of B. Pt.$_{0.1}$ 54 to 55° C. amounted to 625 to 630 parts by weight, i. e., 98.5 to 99.3 per cent. of the theoretical.

Example 2

While cooling with ice and stirring, 277 parts by weight of chlorine gas were introduced into a mixture of 500 parts by weight of α-aceto-γ-butyrolactone, 500 parts by weight of water and 180 parts by weight of magnesium carbonate. When the chlorination had come to an end, excess magnesium carbonate was dissolved with a little concentrated hydrochloric acid and the supernatant aqueous magnesium chloride solution separated from the α-chloro-α-aceto-γ-butyrolactone in a separating funnel.

As in Example 1, yields of 625 to 630 parts by weight were obtained.

I claim:

1. A process of producing α-aceto-α-chloro-γ-butyrolactone which comprises reacting α-aceto-γ-butyrolactone with chlorine gas in the presence of water and an alkaline earth metal carbonate to bind the acid formed by the chlorination.

2. A process of producing α-aceto-α-chloro-γ-butyrolactone which comprises reacting α-aceto-γ-butyrolactone with chlorine gas in the presence of water and calcium carbonate to bind the acid formed by the chlorination.

3. A process of producing α-aceto-α-chloro-γ-butyrolactone which comprises reacting α-aceto-γ-butyrolactone with chlorine gas in the presence of water and magnesium carbonate to bind the acid formed by the chlorination.

ROBERT ZUMBRUNN.

REFERENCES CITED

The following references are of record in the file of this patent:

UNITED STATES PATENTS

| Number | Name | Date |
|---|---|---|
| 2,218,349 | Buchman | Oct. 15, 1950 |